United States Patent [19]

Nonoyama et al.

[11] Patent Number: 5,029,228

[45] Date of Patent: Jul. 2, 1991

[54] IMAGE DATA FILING SYSTEM

[75] Inventors: Yasumasa Nonoyama; Chizuko Inoue, both of Hyogo, Japan

[73] Assignee: Mitsubishi Denki Kabushiki Kaisha, Tokyo, Japan

[21] Appl. No.: 288,569

[22] Filed: Dec. 22, 1988

[30] Foreign Application Priority Data

Dec. 28, 1987 [JP] Japan .................................. 62-329851
Jan. 25, 1988 [JP] Japan .................................. 63-12554

[51] Int. Cl.$^5$ ............................................. G06K 9/00
[52] U.S. Cl. ......................................... 382/56; 382/47; 340/731
[58] Field of Search ........................... 382/56, 47, 41; 340/731; 364/715.04, 715.07

[56] References Cited

U.S. PATENT DOCUMENTS

| | | | |
|---|---|---|---|
| 4,546,349 | 10/1985 | Prohofsky et al. | 340/731 |
| 4,675,908 | 6/1987 | Saito et al. | 382/47 |
| 4,754,270 | 6/1988 | Murauchi | 340/731 |
| 4,764,975 | 8/1988 | Inoue | 382/56 |
| 4,783,841 | 11/1988 | Crayson | 382/56 |

Primary Examiner—Leo H. Boudreau
Assistant Examiner—Yon Jung
Attorney, Agent, or Firm—Rothwell, Figg, Ernst & Kurz

[57] ABSTRACT

An image data filing system wherein an original drawing is converted into digital image data, which is made to have a unity-scale for file management, then divided into several divisional image data having a fixed data size as units of storing data within a record file, can easily perform a continuous display with adjacent drawings, and also, a high speed reduced/enlarged display similar to original-size one because of storing the image data of several different scales within the record file.

2 Claims, 6 Drawing Sheets

IMAGE DATA FILING SYSTEM

BACKGROUND OF THE INVENTION

1. Field of the Invention

This invention relates to an image data filing system which reads an original drawing such as a map or the like by an image scanner and manages it as image data.

2. Description of the Prior Art

Figure 1:
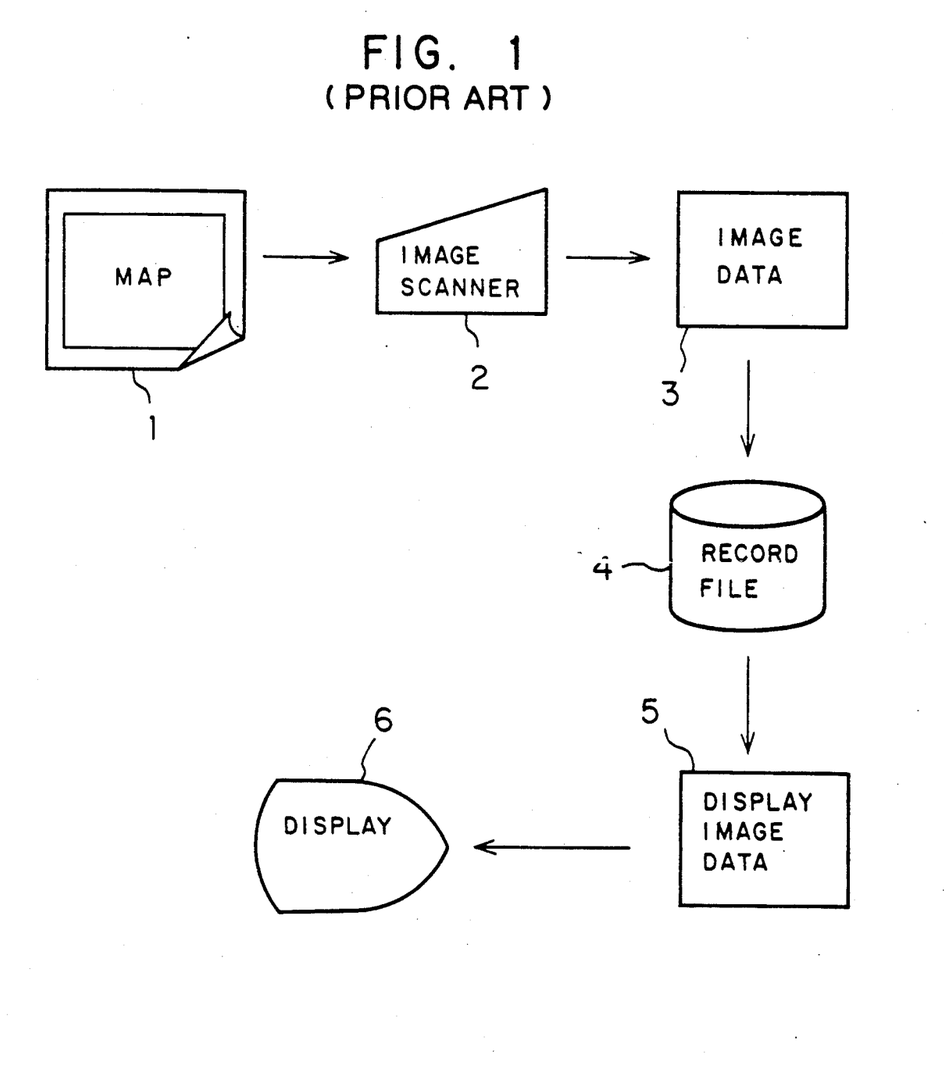
FIG. 1 is an explanatory view showing a first conventional image data filing system.

FIG. 1 is an explanatory view showing a first conventional image data filing system, in which reference numeral 1 designates a map as an original drawing to be input; 2, an image scanner for reading the map 1 and converting it into digital image data; 3, image data output from the image scanner 2; 4, a record file such as an optical disc or the like for storing the image data 3; 5, a display image data read from the record file for display; and 6, a display device such as a CRT display for displaying the display image data 5.

Next, the operation of this system will be described. In the case where the map is subjected to filing management as image data, the map 1 as the original drawing is first read by the image scanner 2 and converted into the digital image data 3. The image data 3 converted by the image scanner 2 in this manner is fed to the record file 4, where it is written and stored into a predetermined record area. When the need occurs for the stored image data 3 to be displayed on the display device 6, this is fed as the display image data 5 read from the record area of the record file 4 to the display device 6 to be displayed thereon.

Since the first conventional image data filing system is constructed as described above, the image data 3 is subjected to read/write processing in units of the original drawing as an input, and this poses a problem of difficulty in portraying a continuous display of plural adjacent originals, more particularly, a unity-scale continuous display of plural adjacent originals having different original scale factors, which still remains especially in case of a map or the like.

Figure 2:
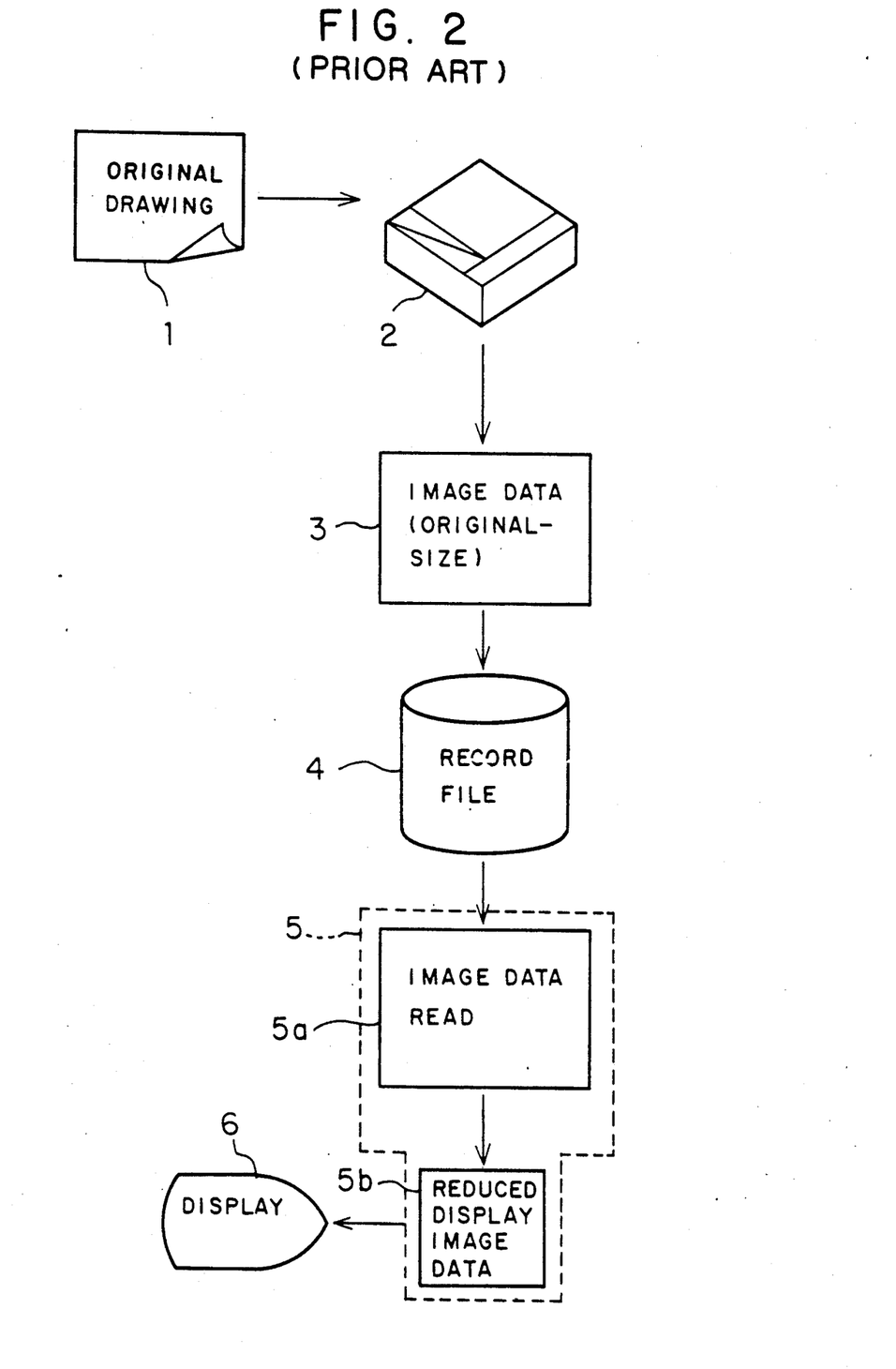
FIG. 2 is an explanatory view showing a second conventional image data filing system.

FIG. 2 is an explanatory view showing a conventional second image data filing system, which is the same as the structure shown in FIG. 1 except that the display image data 5 in the first conventional image filing system shown in FIG. 1 is replaced by a read image data 5a of an original scale read from the record file 4 and a reduced display image data 5b whereto said read image data is reduced. Parts in FIG. 2 which are the same or correspond to those shown in FIG. 1 are indicated by the same reference numeral as used in FIG. 1, the detailed description of which is omitted.

The operation will be described hereinafter. For example, in the case where the drawing as an image data is subjected to filing management, the drawing 1 as the original drawing is first read by the image scanner 2 and converted into the original size digital image data 3 on the scale of 1/1. The original size image data 3 read by the image scanner 2 in a manner as described is fed to the record file 4, where it is written and stored into a predetermined record area. When the need occurs for the stored image data 3 to be displayed on the display means 6 on the scale of 1/5, the read image data 5 on the scale of 1/1 is first read from the record area of the record file 4, and is subjected to reduction processing to generate a reduced display image data 5b on the scale of 1/5, which is sent to the display means 6 for display.

Since the second conventional image data filing system is constructed as described above, the image data is stored only as the original size image data 3 on the scale of 1/1 in the record file 4. In the case where the need occurs for a reduced drawing (an enlarged drawing) to be displayed on the display means 6, the read image data 5 on the scale of 1/1 read from the record file 4 need to be subjected to reduction (enlargement) processing every time to a reduced (enlarged) scale to be displayed, posing a problem that a considerably long processing time is required before the data is displayed on the display means.

SUMMARY OF THE INVENTION

An object of this invention is to provide an image data filing system which can easily perform a continuous display of plural adjacent originals, and furthermore, a unity-scale continuous display of plural adjacent originals having different original scales.

A further object of this invention is to provide an image data filing system which can display even a reduced drawing (an enlarged drawing) at a high speed similar to an original size drawing.

For achieving the aforementioned objects, in an image data filing system according to this invention, an image data read from an original drawing is enlarged/reduced to a normalized scale for file management, and then, divided into divisional image data of a fixed data size as a unit data block to be stored in a record file.

Furthermore, in the image data filing system according to this invention, an image data read from an original drawing is stored into a record file in plural scales, and in case of displaying, an image data having the scale to be displayed is selected from the image data having said plural scales and is directly read as a display image data from a record file.

DETAILED DESCRIPTION OF THE PREFERRED EMBODIMENTS

Preferred embodiments of this invention will be described hereinafter with reference to the accompanying drawings.

Figure 3:
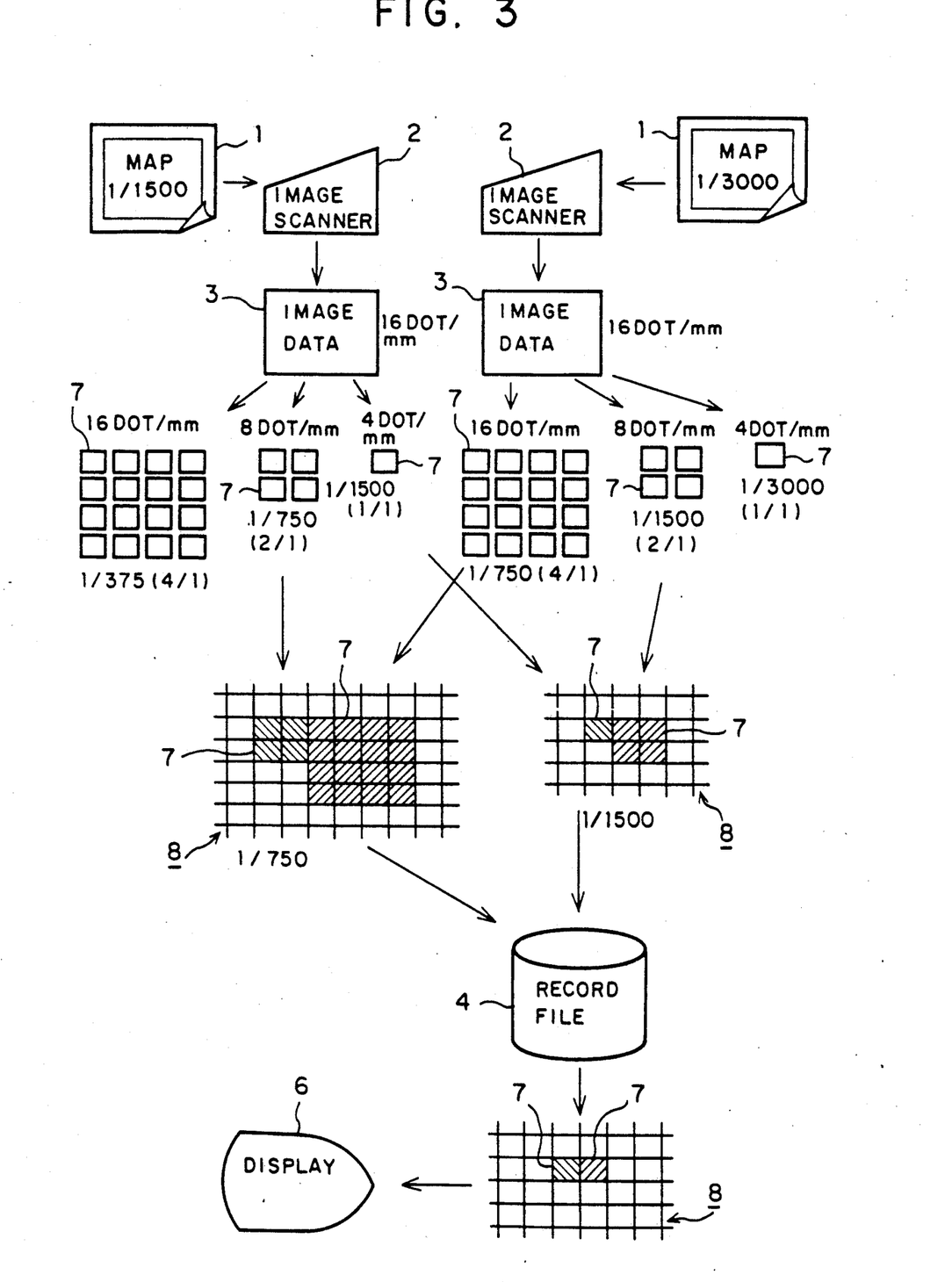
FIG. 3 is an explanatory view showing an image data filing system according to one embodiment of this invention.

In FIG. 3, reference numeral 1 designates a map as an original drawing; 2, an image scanner; 3, an image data; 4, a record file; and 6, a display device, which are the same as or correspond to those of the prior art indicated by the same numerals in FIG. 1 and therefore the detailed description thereof will be omitted. Reference numeral 7 designates a divisional image data obtained by dividing each image data 3, which is converted from a map 1 having each different scale and enlarged/reduced to a unity-scale for file management, into a fixed data size irrespective of the size of each map 1. Numeral 8 designates an atlas composed of a plurality of maps. The aforesaid divisional image data 7 is sent to a specific memory area with reference to the coordinates on the atlas 8.

Figure 4:
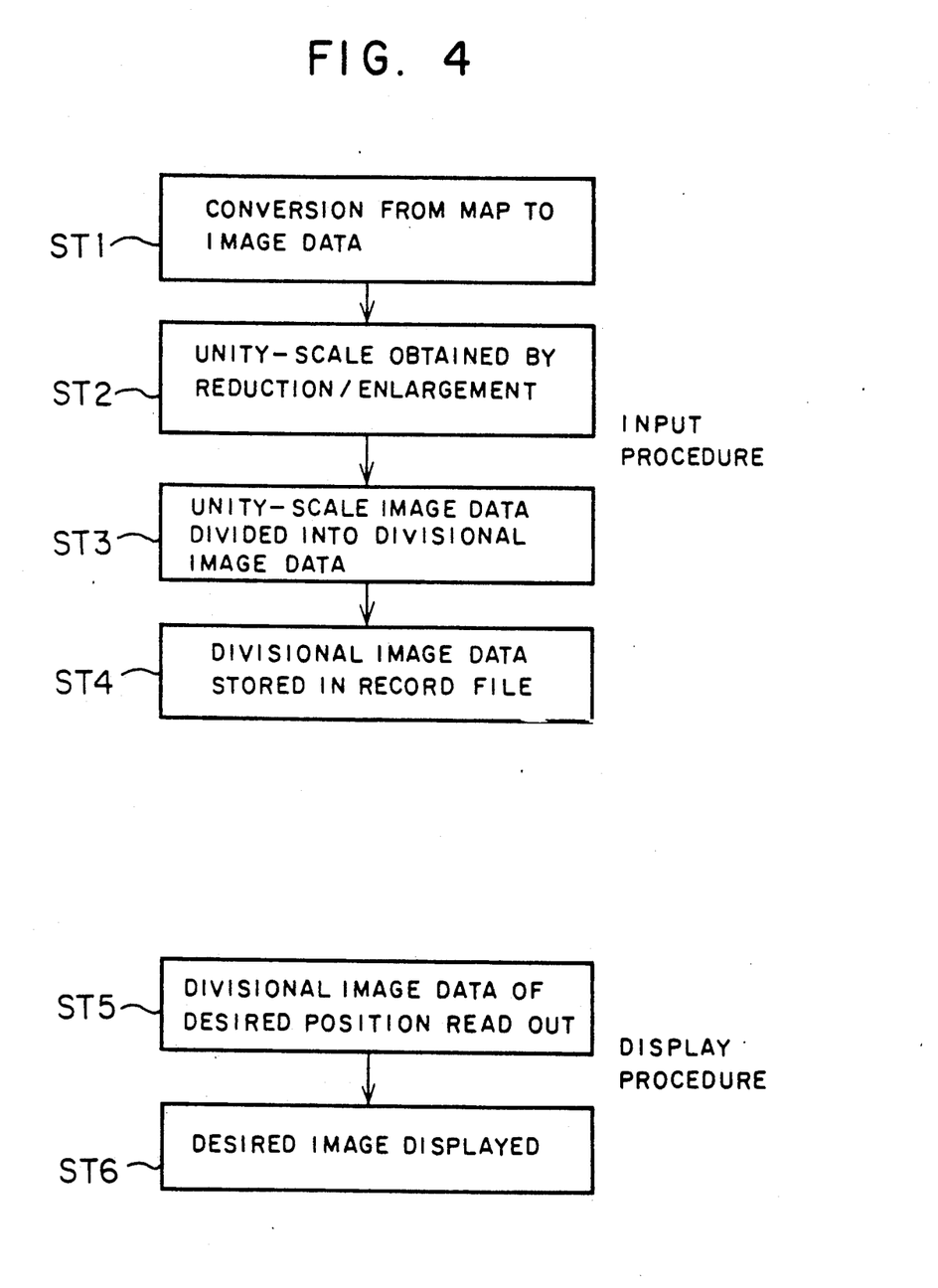
FIG. 4 is a flow chart showing the operation procedure of FIG. 3.

Next, the operation will be described. FIG. 4 is a flow chart showing the procedure of the operation. In case where each map 1 on the different scale of 1/1,500 and 1/3,000 is subjected to filing management as an image data, the map 1 on the scale of 1/1,500 is first read by the image scanner 2 and converted into the digital image data 3 (ST 1). At that time, the resolution of the image scanner 2 is, for example, 16 dots/mm.

Next, the image data 3 is reduced to generate the image data having resolutions of 16 dots/mm, 8 dots/mm, and 4 dots/mm (ST 2). The image data of 16 dots/mm is divided into 16 parts, the image data of 8 dots/mm is divided into four parts, and the image data of 4 dots/mm remains undivided to generate divisional image data 7 which have all the same data size (ST 3).

The divisional image data 7 are sent to specific memory areas with reference to the coordinates on the atlas 8 and stored into the record file 4 in units of the divisional image data (ST 4).

At this time, since in this case the resolution of the display device is 4 dots/mm, the divisional image data 7 of 16 dots/mm, the divisional image data 7 of 8 dots/mm, and the divisional image data of 4 dots/mm are sent to a specific memory are with reference to the coordinates on the atlas 8 of 1/375, the coordinates on the atlas 8 of 1/750, and the coordinates on the atlas 8 of 1/1,500, respectively. FIG. 3 shows merely the atlas 8 of 1/750 and 1/1,500.

Next, image processing of the map 1 of 1/3,000 is exactly the same as above, where the map 1 is read by the image scanner 2 and converted into the image data 3 in (ST 1). At this time, the resolution of the image scanner 2 is also 16 dots/mm.

Subsequently, in (ST 2), the image data 3 is reduced to generate image data of resolutions of 16 dots/mm, 8 dots/mm, and 4 dots/mm, and thereafter in (ST 3), they are divided into 16 parts, 4 parts, and 1 part, respectively, to generate the divisional image data 7 which have all the same data size, and in (ST 4), they are stored in the record file 4 in units of the divisional image data 7.

The map 1 has a scale of 1/3,000 which is half 1/1,500, and therefore, when the divisional image data 7 is sent to a specific memory area with reference to the coordinates on the atlas 8, the divisional image data of 16 dots/mm, the divisional image data of 8 dots/mm, and the divisional image data 7 of 4 dots/mm are sent to the coordinates on the atlas 8 of 1/750, the coordinates on the atlas 8 of 1/1,500, and the coordinates on the atlas 8 of 1/3,000.

When the divisional data 7 stored in the record file 4 as described above are required to be displayed on the display device 6, it is read from the corresponding memory area of the record file 4 and sent to the display device 6 (ST 5) for displaying on the display device 6 (ST 6).

In this case, the adjacent divisional image data 7 as shown are read from the record file 4 and displayed on the display device 6 whereby the continuous display of plural adjacent originals, and further, a unity-scale continuous display of plural adjacent originals having different original scales, can be easily performed.

While in the above-described embodiment, a description has been made of the filing of the image data of a map, it is to be noted that the present invention can be applied to a very large machinery drawing that cannot be displayed at one time on the display device 6, divided drawings (drawings which are too large to be drawn on a standard size sheet and as such are "divided" into several sheets), and other original drawings to obtain the effects similar to those mentioned above.

Figure 5:
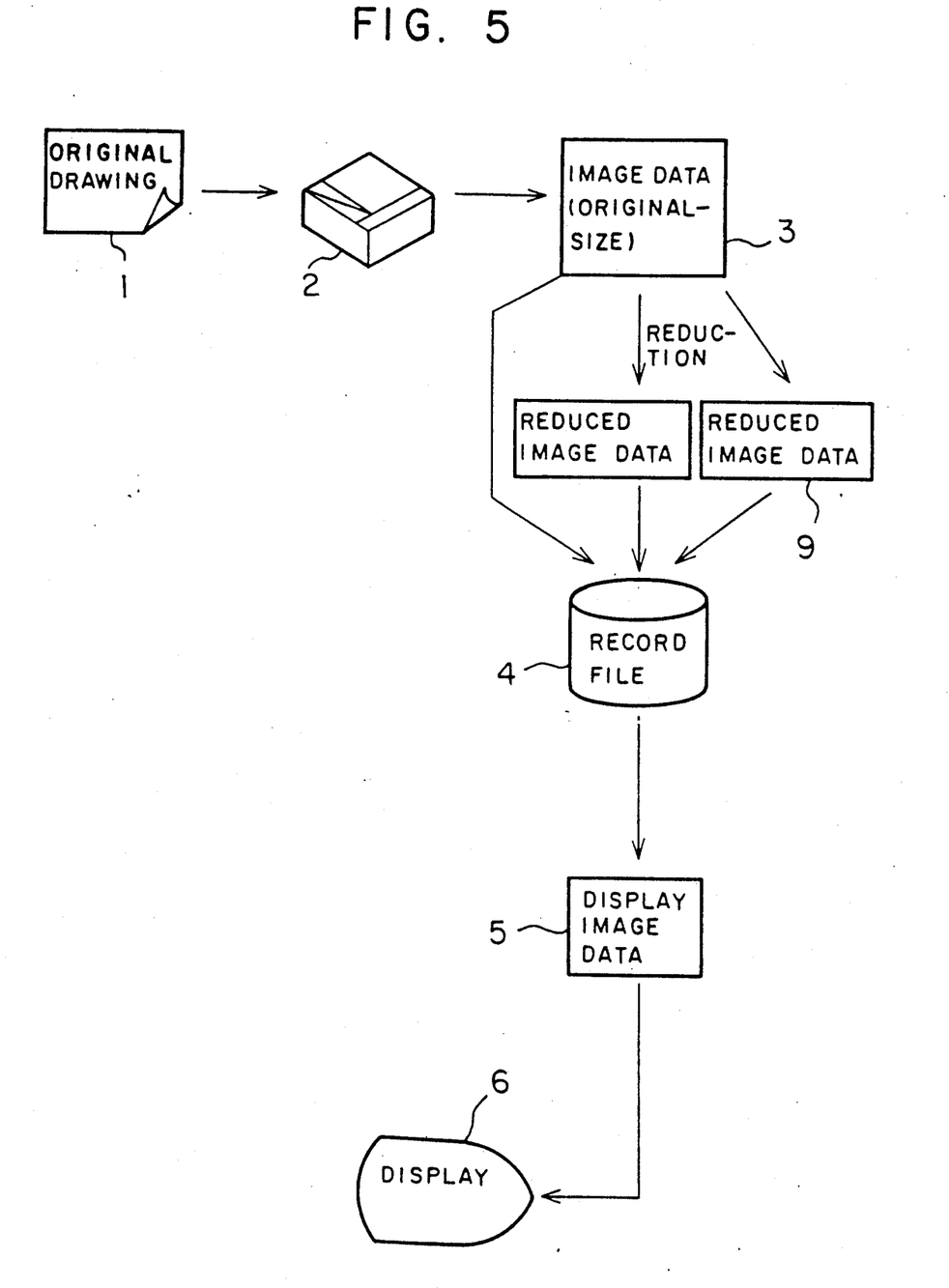
FIG. 5 is an explanatory view showing an image data filing system according to another embodiment of this invention.

Another embodiment of this invention will be described hereinafter with reference to FIG. 5. In FIG. 5, reference numeral 1 designates a map as an original drawing; 2, an image scanner; 3, an image data; 4, a record file; 5, a display image data; and 6, a display device, which are the same as or correspond to those of the prior art indicated at the same reference numerals shown in FIG. 1, and therefore, the detailed description thereof will not be made. Reference numeral 9 designates a reduced image data obtained by reducing the original-size image data 3, read from the drawing 1, to several different scales of, i.e., 1/2, 1/5, 1/10 . . . etc. The record file 4 is rather different from that of the prior art in that reduced image data 9 as well as the original-size image data 3 having a scale of 1/1 are stored.

Figure 6:
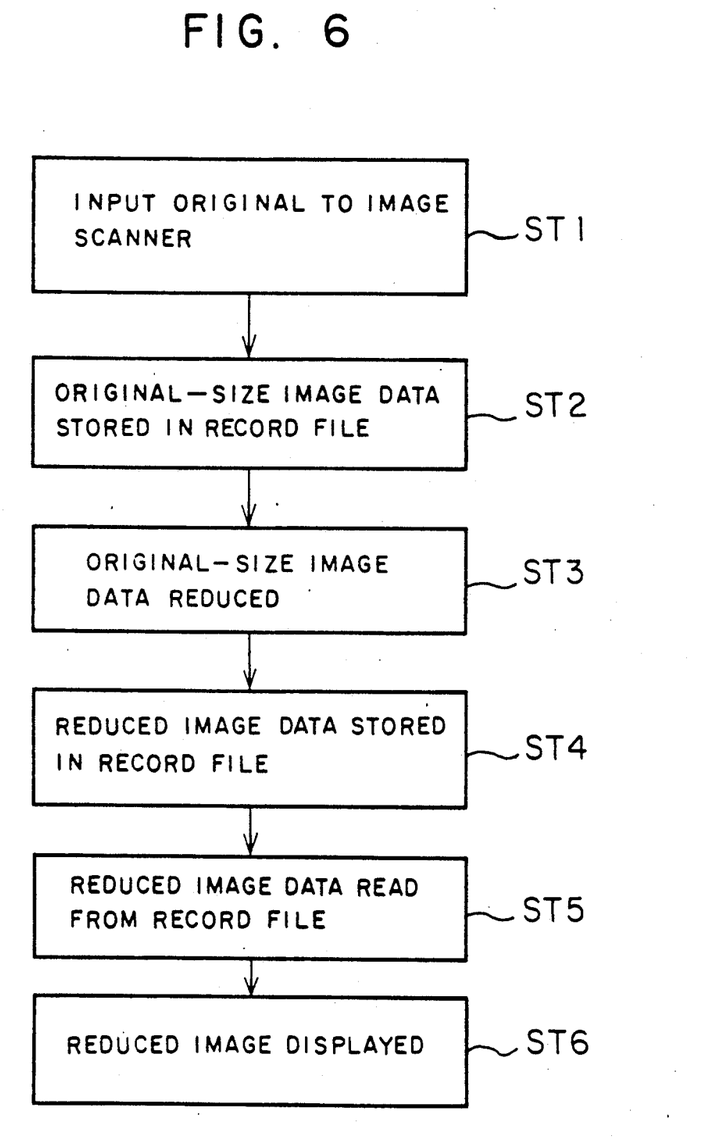
FIG. 6 is a flow chart showing the operation procedure of FIG. 5.

Next, the operation will be described. FIG. 6 is a flow chart showing the procedure of the operation. First, a drawing 1 to be registered is read by the image scanner 2 to convert it into the original-size digital image data 3 (ST 1), and the original-size image data 3 is registered and stored in a predetermined memory area of the record file 4 (ST 2). Next, the original-size image data 3 is reduced, by a reducing process, to the scales of, for example, 1/2, 1/5, 1/10 and the like, which are often used as displays on the display means 6, to generate the reduced image data 9 (ST 3), and the reduced image data 9 is also registered and stored in a predetermined memory area of the record file 4 similar to the original-size image data 3 (ST 4). In this manner, the image data 3 and 9 having plural scales with respect to the same drawing 1 are stored in the record file 4.

When the drawing 1 is required to be displayed on the display device 6, the scale to be displayed is designated access to the record file 4. Thereby the display image data 5 of the scale desired is directly read from the memory area of the record file 4 (ST 5) and sent to the display device 6 to be displayed on it (ST 6). In this case, the display image data 9 read from the record file 4 is directly sent to the display device 6 without the necessity of reduction processing, similar to the case of the display of image data on the scale of 1/1, even if the designated scale is not 1/1.

While a description has been made of the case where the reduced image data of scales, 1/2, 1/5, . . . are stored in the record file, it is to be noted that enlarged image data on the scales of 2/1, 5/1, . . . may be stored, and the number of reduced image data and enlarged image data with respect to one original drawing may be suitably selected at need. In either case, the effect similar to that of the above-described embodiment may be obtained.

As described above, according to this invention, the image data read from the original drawing is enlarged/reduced to a unity-scale for filing management, and then divided into a fixed data size to generate the divisional image data, and stored in the record file as units thereof. Therefore, drawings divided into plural sheets such as maps can be displayed in their suitable portions as a continuous display of plural adjacent originals, and a unity-scale continuous display of plural adjacent originals having different original scales, in an easy manner.

Furthermore, in case of carrying out the display, the divisional image data is merely read and other special processes are not required, and therefore high speed responsiveness can be realized as compared with the prior art.

Moreover, the original drawing is read to convert it into the digital image data, the image data is stored in the record file in a plurality of scales, and data of a predetermined scale is read as a display image data out of the image data in a plurality of scales, and directly displayed on the display device. Therefore, in displaying a reduced drawing and an enlarged drawing, processes for reduction and enlargement are not required, thus providing an image data filing system capable of displaying reduced or enlarged images at the speed equal to display of the original-size drawing.

What is claimed is:

1. An image data filing system, comprising:

reading means for scanning an original image of a particular scale and converting said original image into digital image data;

converting means for converting said digital image data into a plurality of image data each of a different scale;

dividing means for dividing each of said different scaled image data into a plurality of blocks such that each of said blocks consists of the same amount of digital image data; and storing means for storing said blocks in a plurality of memory areas corresponding to said plurality of different scales, each area storing blocks of the same scale to form a storage unit containing scaled and divided image data;

said image data filing system allowing original images of different scales to be displayed in the same scale as one contiguous image.

2. An image data filing system according to claim 1, wherein said original image is one of a map, a machinery drawing, and a divided drawing.

* * * * *

UNITED STATES PATENT AND TRADEMARK OFFICE
CERTIFICATE OF CORRECTION

PATENT NO. : 5,029,228

DATED : July 2, 1991

INVENTOR(S) : Yasumasa Nonoyama et al.

It is certified that error appears in the above-identified patent and that said Letters Patent is hereby corrected as shown below:

Column 1, line 50, delete "numeral" and insert therefor --numerals--.

Column 2, line 5, delete "need" and insert therefor --needs--;

Column 4, line 21, after "that" insert --these--.

Signed and Sealed this

Ninth Day of March, 1993

Attest:

STEPHEN G. KUNIN

*Attesting Officer*     *Acting Commissioner of Patents and Trademarks*